April 1, 1930.    W. C. STEVENS    1,753,175
TIRE TESTING MACHINE
Filed March 27, 1924    7 Sheets-Sheet 4
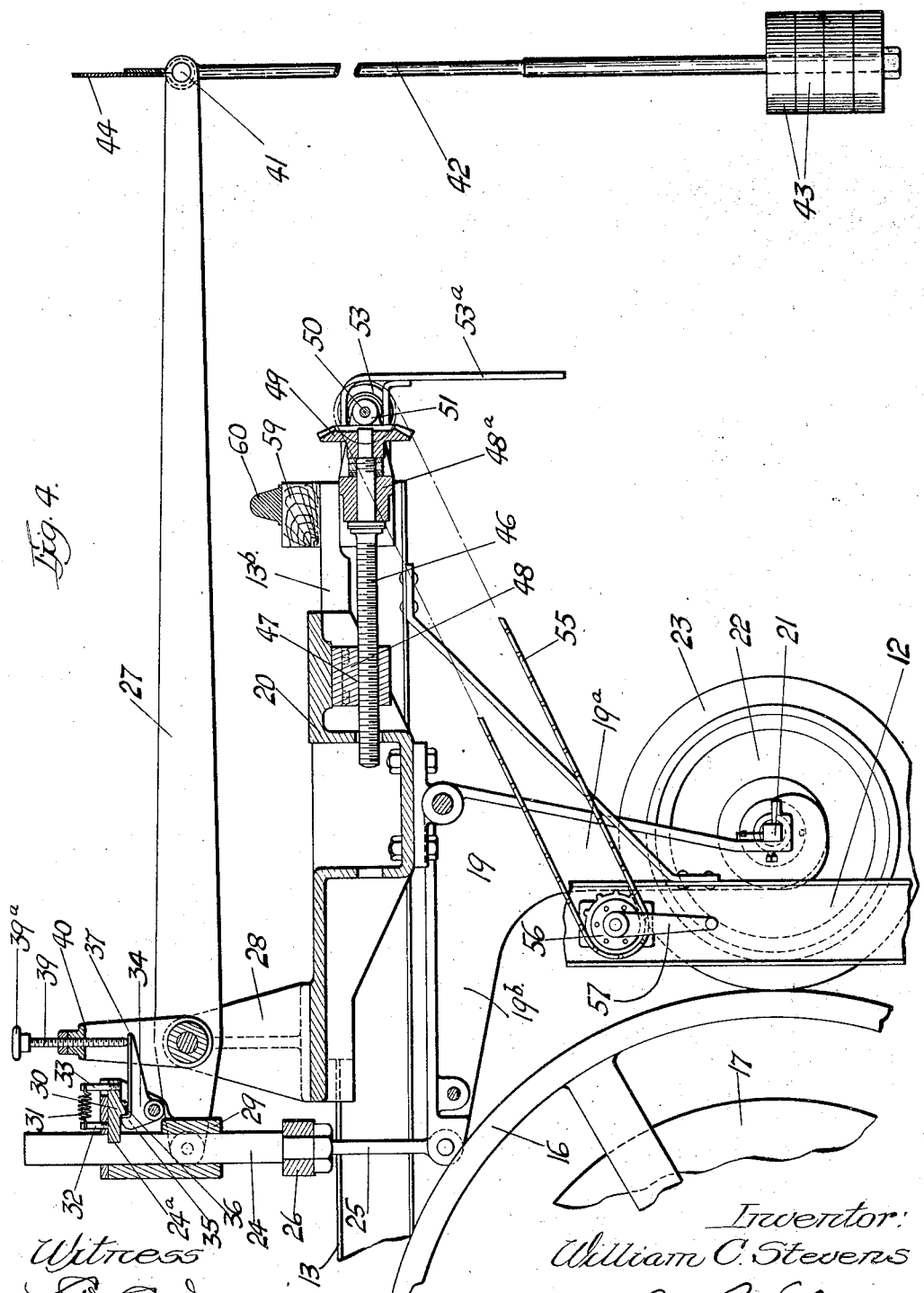

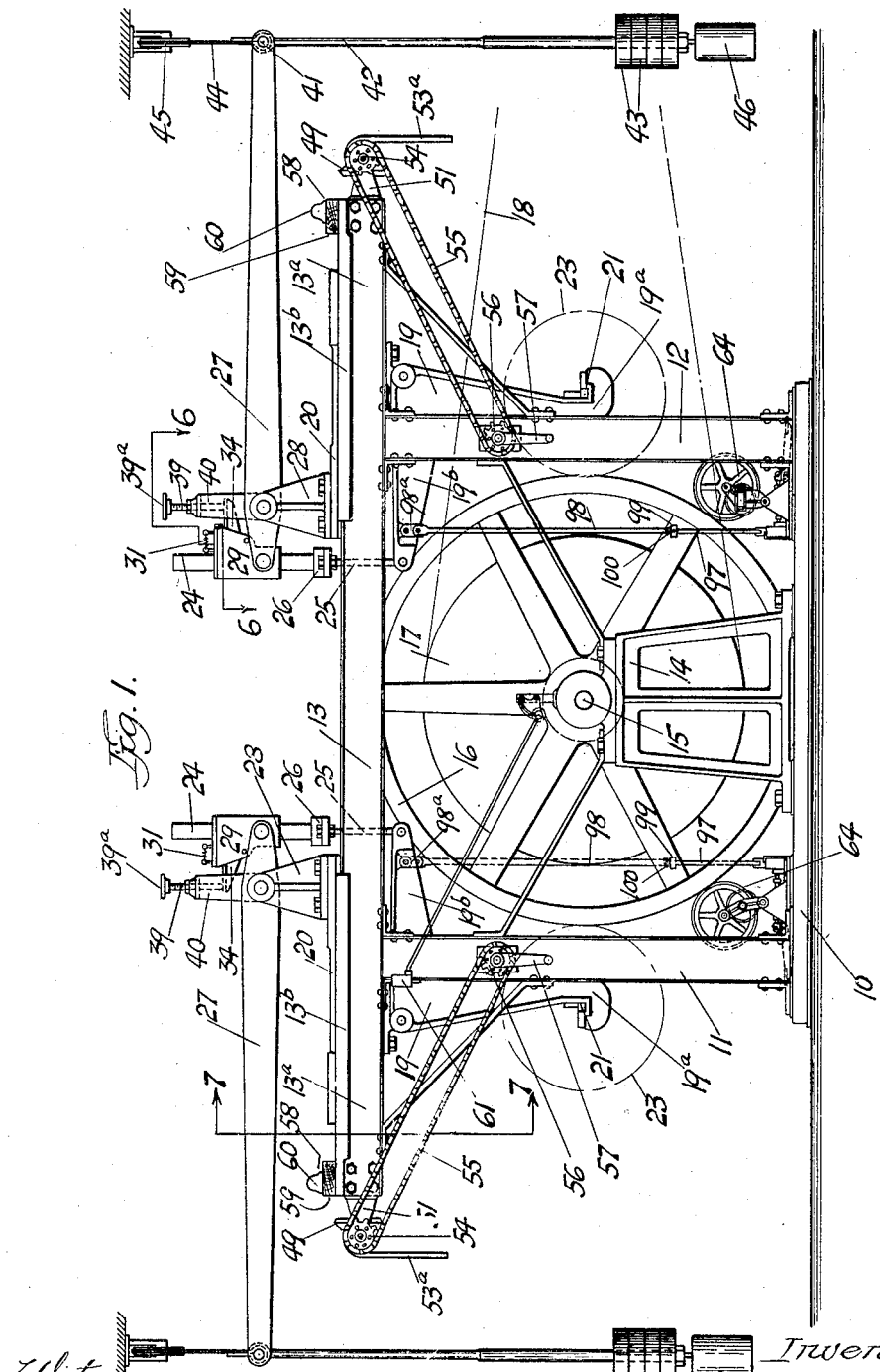

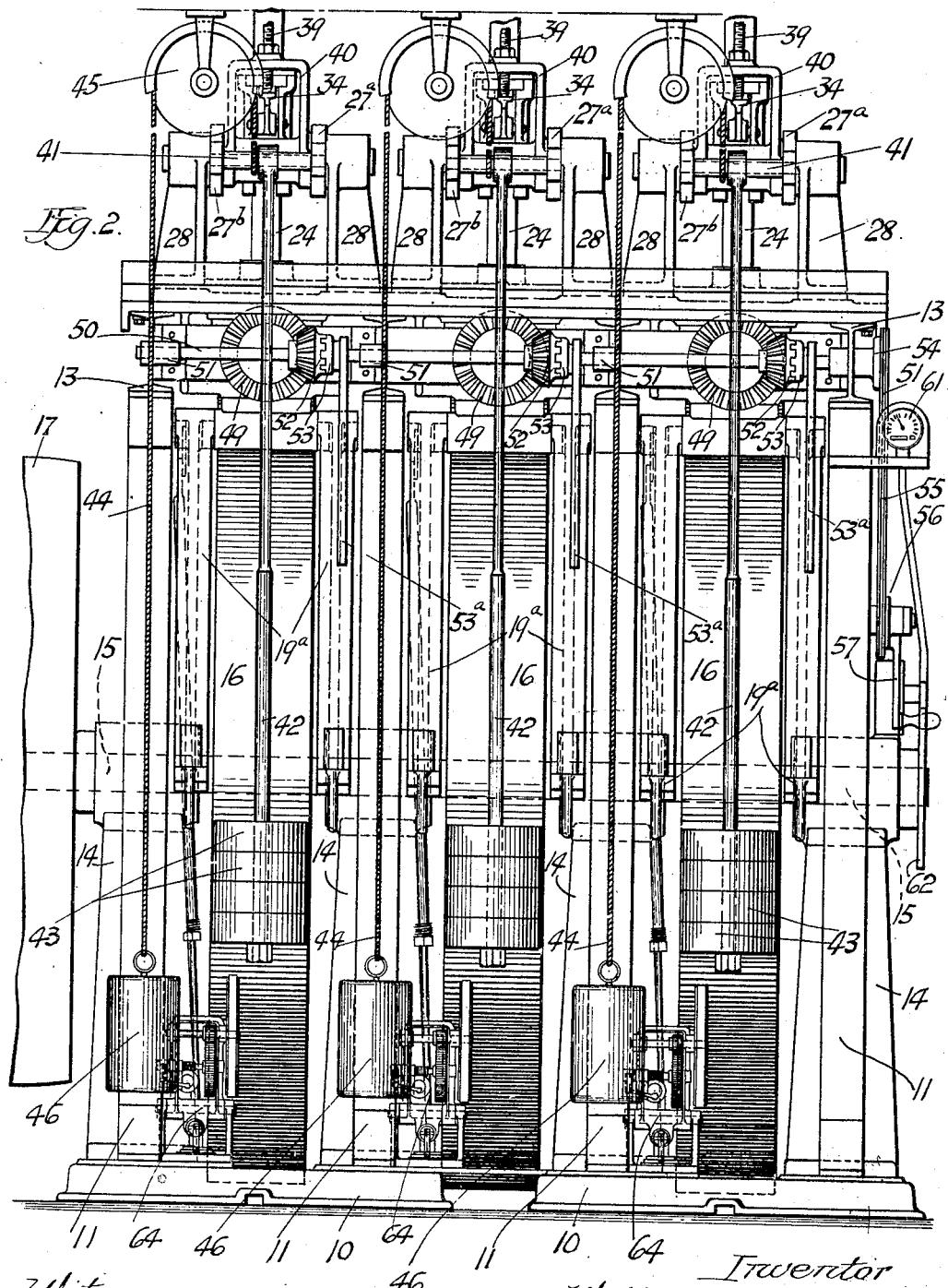

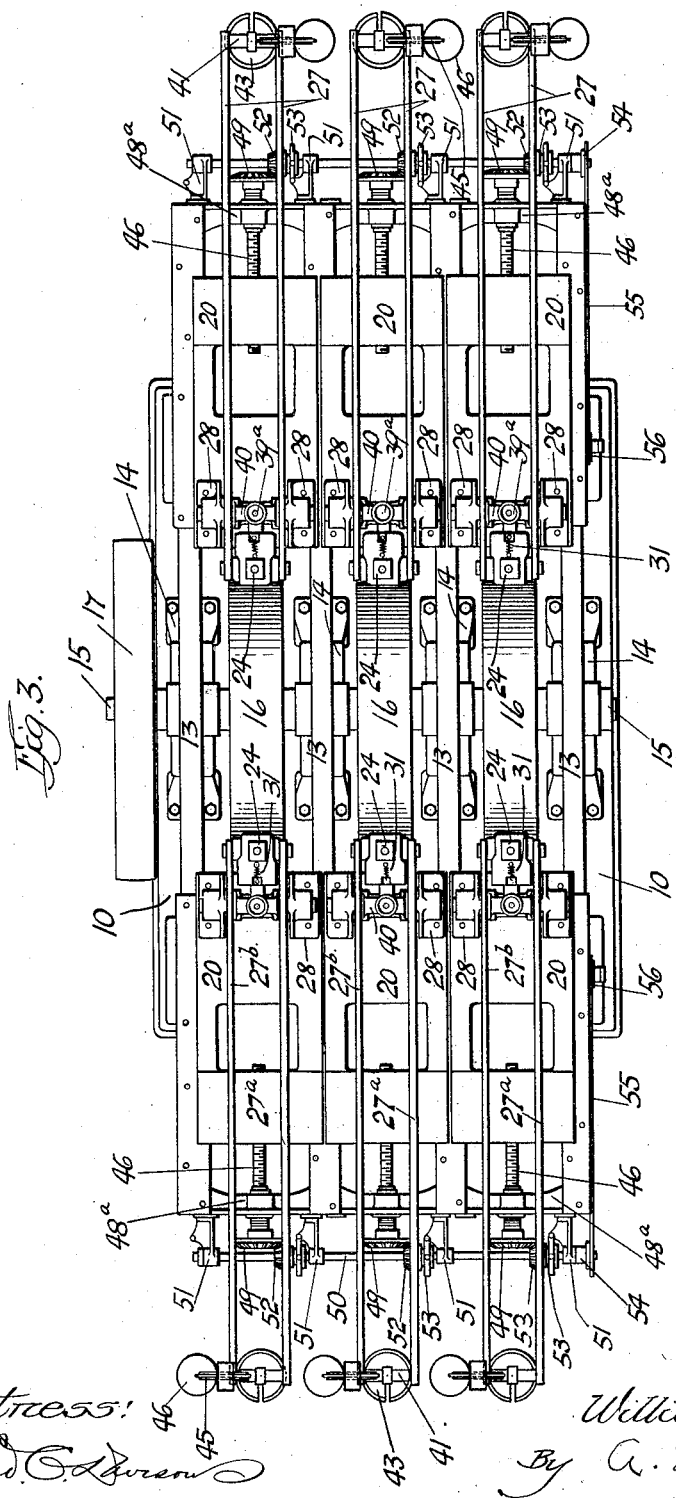

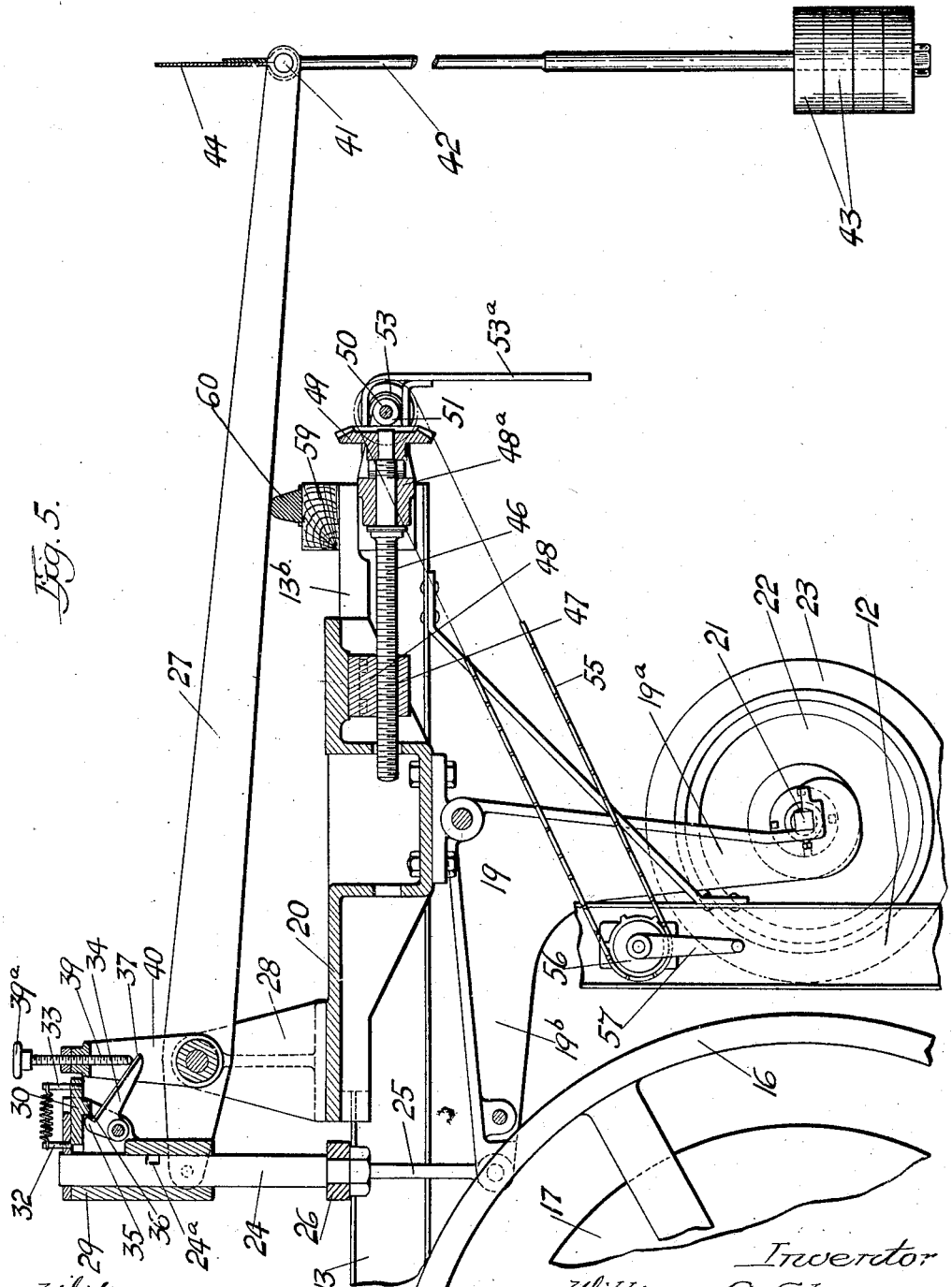

April 1, 1930.  W. C. STEVENS  1,753,175
TIRE TESTING MACHINE
Filed March 27, 1924   7 Sheets-Sheet 6
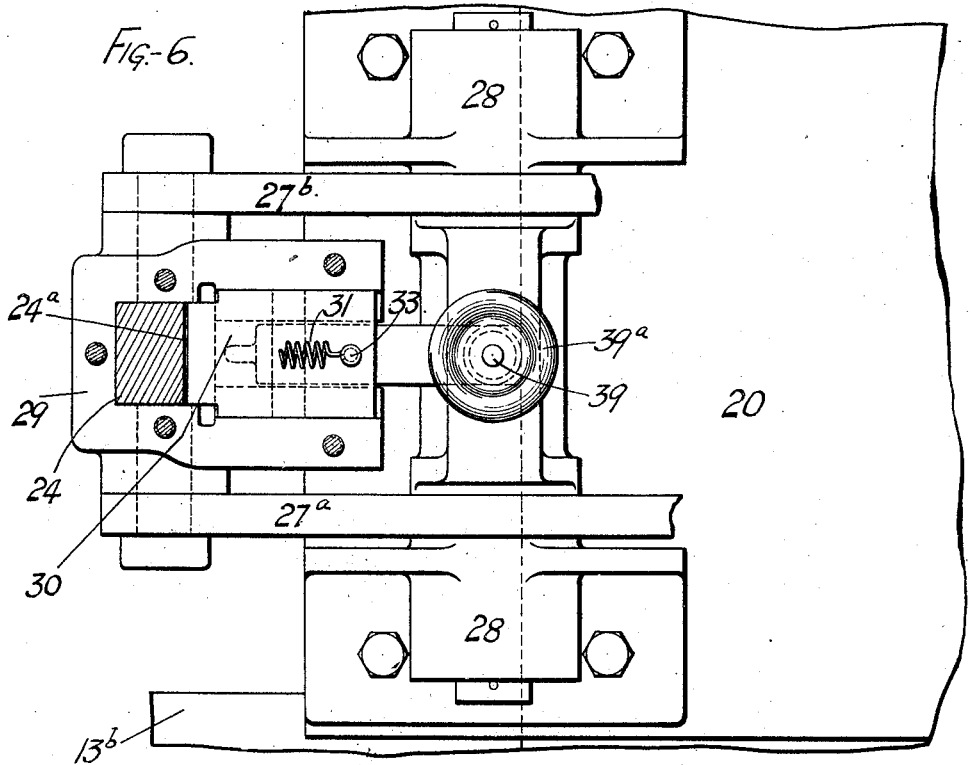
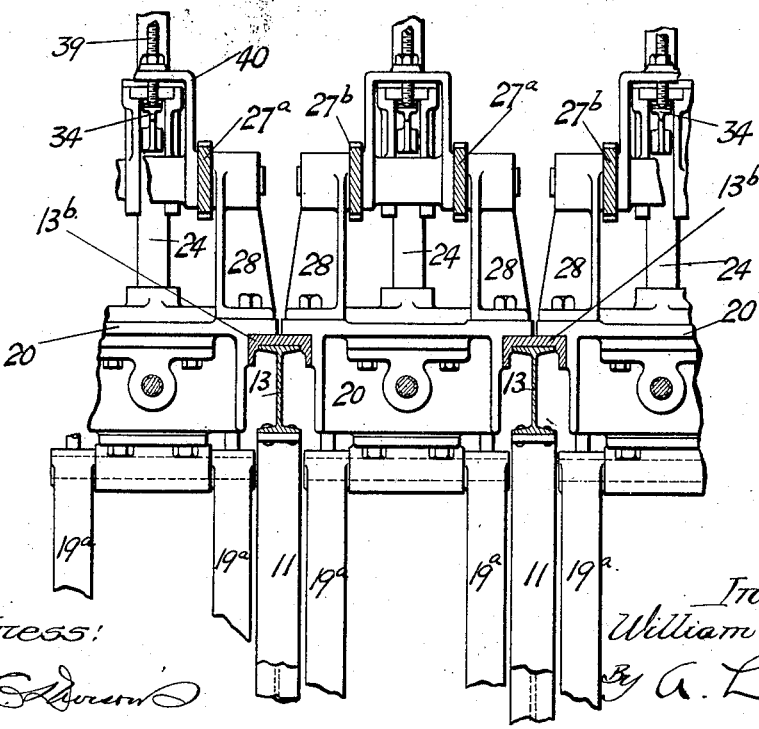
Inventor:
William C. Stevens

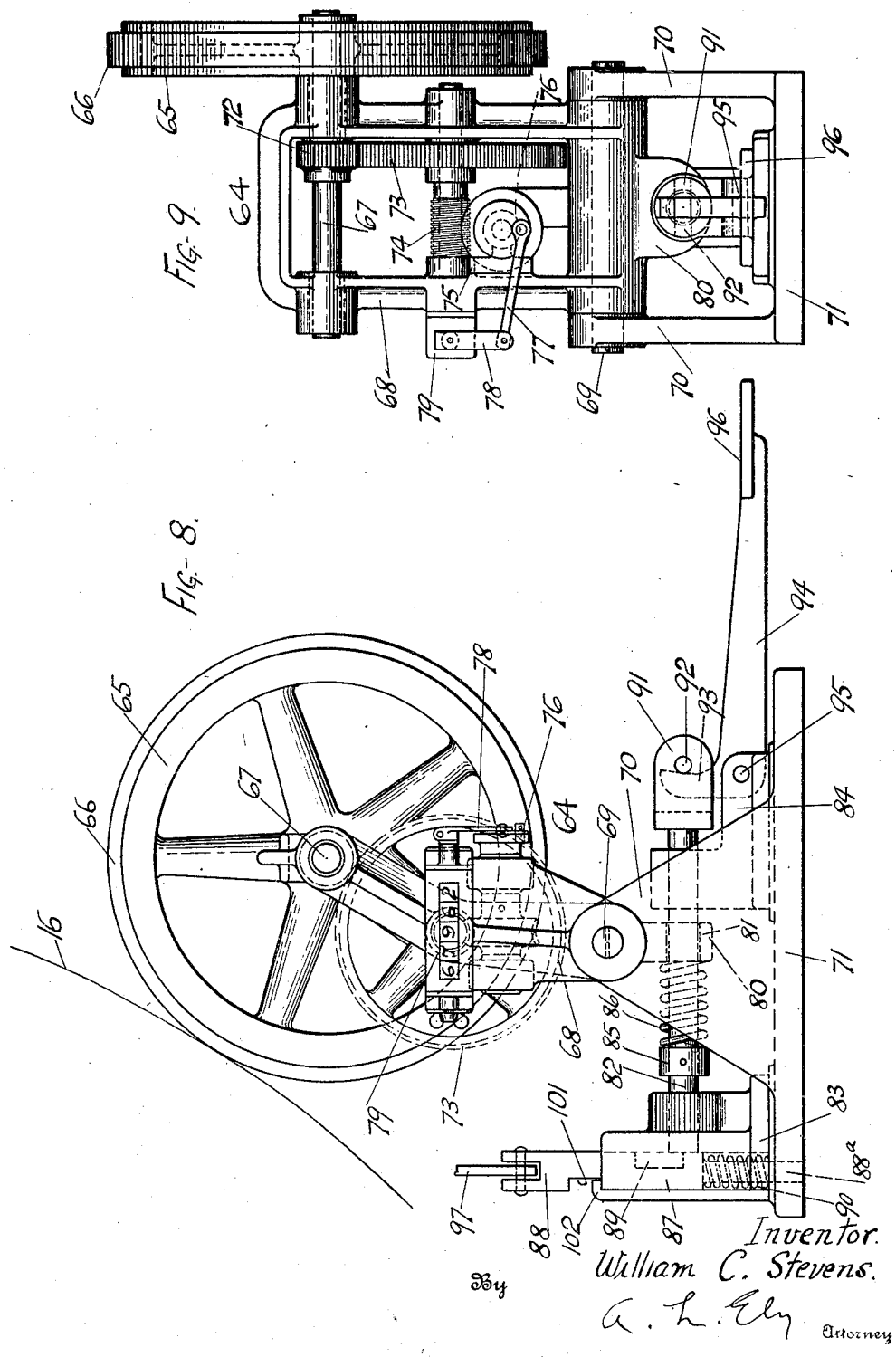

Patented Apr. 1, 1930

1,753,175

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

TIRE-TESTING MACHINE

Application filed March 27, 1924. Serial No. 702,344.

This invention relates to tire testing machines and particularly to machines especially adapted for the testing of pneumatic tires.

It is the custom for large manufacturers of tires to submit samples of their product and also those of competitors to wear and blow-out tests. Certain of these tests are made on especially designed machines comprising a rotary drum against the surface of which is pressed the periphery of a rotatably mounted tire, the drum being rotated at a speed such as to cause the tire to travel on its surface at a rate corresponding to an average road-speed of automobiles. These drums have been formed with obstructions on their surface or have had grease or oil distributed thereon etc., to more nearly approximate certain road conditions to which the tires are subjected in use.

In general, the purpose of my invention is to provide an improved tire-testing machine and particularly one capable of more accurately determining the time in which a tire wears out or blows-out. More specifically one of my objects is to provide means for automatically withdrawing a tire from engagement with the drum when it wears down a determinate distance through the casing, for example, through the tread, or when it blows out, or when the pressure therein becomes too low etc. Another and equally important object is to provide means effective only when the tire is in contact with the drum for determining the exact mileage of the tire, the means being adapted automatically to discontinue registering mileage when the tire is for any purpose withdrawn from the contact with the drum.

Other objects will appear from the following detailed description of the invention, it being understood that I do not wholly limit my claims to the specific details described.

Of the accompanying drawings in which I illustrate my invention in its preferred form:

Figure 1 is a side elevation of a machine embodying my invention.

Figure 2 is an enlarged left end elevation of the machine shown in Figure 1.

Figure 3 is a plan of the machine.

Figure 4 is an enlarged elevation partly broken away and partly in section of the right upper portion of the machine as shown in Figure 1.

Figure 5 is a view similar to Figure 4, showing the parts in another position.

Figure 6 is a section on line 6—6 of Figure 1.

Figure 7 is a section on line 7—7 of Figure 1.

Figure 8 is an enlarged side elevation of the mileage counter shown at the lower right corner of Figure 1.

Figure 9 is a right end elevation of the counter shown in Figure 8.

In the drawings, 10, 10 are bases or supports upon which are mounted a series of standards 11, 11 and a series of standards 12, 12 substantially equally spaced apart respectively along the left and right ends of the bases 10. Secured on the upper ends of the standards 11 and 12 are a series of beams 13, 13 of such length as respectively to project beyond or overhang each pair of standards 11 and 12, the overhanging portions of beams 13 being denoted 13$^a$, 13$^a$. Midway between each pair of standards 11 and 12 on the bases 10 are a series of bearing brackets 14, 14 in which is journaled a drive shaft 15. Secured on the drive shaft 15 are a series of drums 16, 16 so positioned on the shaft 15 as to be in alinement with the spaces between the standards 11 and the spaces between the standards 12. The drums 16 may be driven in any suitable manner as by a pulley 17 secured on shaft 15 and driven by a belt 18.

For holding tires against the drums 16 under a determinate pressure corresponding to the average load on the tire when in use, or to greater loads if it be desired to hasten the test, there are provided a series of pairs of bell-crank levers 19, 19 each pair of the latter being so journaled on a slidable bracket 20 as to be bodily movable toward and from the drums 16 through the spaces between standards 11 or 12. Each bell-crank lever 19 is so supported with relation to each drum 16, that one of its arms 19$^a$ will normally tend to swing away from said drum due to the weight of the lever. The arm 19$^a$ is formed with a hook-shaped bracket adapted removably to receive a squared end of a rod 21 on which is journaled a wheel 22 having suitably mounted thereon a tire 23. The arms 19$^b$ of each pair of the levers 19 is connected to a vertically movable post 24 by rods 25, 25. The rods 25 being connected to a crosshead 26 secured to the lower end of the post 24 and the crosshead 26 being so formed as to span a pair of beams 13 to limit by engagement with the latter, the downward motion of arms 19$^b$ and consequently the outward movement of arm 19$^a$ carrying the tire.

In testing a tire, a determinate load should be applied thereto. To this end, there is provided levers 27, 27 each comprising spaced members 27$^a$ and 27$^b$ pivoted on brackets 28, 28 secured on each sliding bracket 20. The levers 27 are adapted to be releasably secured to the posts 24 by latching-heads 29, 29 slidably embracing the posts 24, the ends of lever members 27$^a$ and 27$^b$ being respectively connected to the opposite sides of each head 29. Each post 24 has a slot 24$^a$ therein and reciprocably mounted in each head 29 is a latch 30 adapted to enter the slot 24$^a$. The latch 30 is normally urged toward the post 24 by a retractile spring 31 attached at one end to a peg 32 secured on the head 29 and attached at the other end to a peg 33 secured on the latch 30. For urging the latch 30 from the slot 24$^a$ under certain determinate conditions, a trip lever 34 is pivoted on the head 29 and is formed on one end with a hook-shaped portion 35 adapted to engage a projection 36 formed on the latch 30, the other end 37 of the the lever 34 being adapted to be engaged by the end of a vertical threaded rod 39, screw-threadedly received in a bracket member 40 secured on the pivot of lever 27. The rod 39 has a knob 39$^a$ thereon by which it may be vertically adjusted. To the ends of members 27$^a$ and 27$^b$ of each lever 27 is secured a rod 41 having penduously supported thereon a weight hanger 42 adapted to receive weights 43, 43. Also secured to the rod 41 is a cable 44 extending upwardly over a pulley 45, which may be secured to the ceiling of the room in which the tester is installed, and hung on the end of the cable 44 is a weight 46 adapted to counter weight the parts of the system including lever 27, latching head 29, post 24, cross-head 26, rods 25, bell-crank levers 19 and tire mountings 21 and 22.

For adjusting each of the above systems toward and from the drums 16, the slidable brackets 20, which span the beams 13, are adapted to be moved toward or from the drums by screws 46, 46 extending through threaded bores, 47, 47 formed in members 48, 48 secured on the brackets 20. Channel members 13$^b$ preferably are mounted on the beams to slidably support the brackets 20 (see Fig. 7). Each screw 46 is journaled in a block 48$^a$ secured to the ends of a pair of beams 13 and has secured thereon a bevel gear 49. All the screws 46 on each side of the machine are simultaneously or independently operable to move the systems toward or from the drums. The above-described result is secured by the provision of shafts 50, 50 each of which is journaled in brackets 51, 51 secured on the ends of beams 13, the shafts 50 each having bevel gears 52, 52 rotatably mounted thereon and in mesh with gears 49 and each gear 52 being adapted to be clutched to the shaft member 53 splined on the shaft 50. Clutch control levers are indicated at 53$^a$, 53$^a$. The shafts 50 may be rotated in any suitable manner as by sprockets 54, 54 secured thereon, over which sprockets are trained chains 55, 55 which latter are driven by sprockets 56, 56 respectivelp journaled on front standards 11 and 12, the sprockets 56 having hand cranks 57, 57 secured thereto.

In order to support the levers 27 when they are released from the posts 24 and in order to absorb the blow of the levers against the frame of the machine when suddenly released due to the occurrence of a blow-out or the like, bumpers 58, 58 are mounted on the beams 13 respectively adjacent the opposite ends thereof. Each bumper 58 comprises a base block 59 which may be of wood and a strip of rubber 60 secured thereon.

To ascertain the speed and the mileage of the tires a speedometer 61 is operated by gear 62, indicated in dotted lines, in Fig. 1, secured on the shaft 15, the speedometer being attached to one of the standards 11, and a mileage indicator 64 is adapted to be engaged with each drum 16.

Each mileage indicator 64 (see Figs. 8 and 9) comprises a wheel 65 having a ring 66 of friction material such as fibre or rubber thereon and adapted to be driven by contact with a drum 16. The wheel 65 is secured on a shaft 67 which is journaled in a bracket 68 pivoted on a pin 69, the pin 69 being supported in brackets 70, 70 formed on the base 71 of the indicating device. The bracket 68 is so formed as to tend to swing away from a drum on its pivot by the action of gravity. A pinion 72 is secured on the shaft 67 and meshes with a gear 73 secured on a worm shaft 74, journaled on the bracket 68, the worm 74 being in driving relation with a worm gear 75 also journaled on the bracket 68 and adapted to drive a crank 76 connected by pitman 77 with arm 78 of a counter of any suitable type, indicated generally by the numeral 79, which is secured on the bracket 68. A lug 80 is so formed on the bracket 68 as to project downwardly between the brackets 70 and has an aperture 81 therein through which extends a rod 82 reciprocably mounted in brackets 83 and 84 mounted on the base 71. A collar 85 is secured on the rod 82 and has attached thereto a spring 86 which encircles the rod and is connected to the lug 80. Slidably mounted in a vertical base 87 in the bracket 83 is a rod 88, slotted as indicated at 89, and normally urged upwardly by a coil spring 90 encircling a reduced portion 88ª of the rod. Spring 86 is adapted resiliently to urge wheel 65 against a drum 16, except when the rod 88 is so depressed against the action of spring 90 that the slot 89 is alined with the rod 82 which will permit the latter to enter the slot.

For disengaging the rod 82 from the slot 89 a yoke 91 is formed on the rod 82 and has a pin 92 therein adapted to be engaged by a suitably shaped arm 93 of a bell-crank lever 94 pivoted at 95 to the bracket 84 and the lever 94 having formed on its other arm a pedal 96. The rod 88 is adapted to be depressed against the action of spring 90 by a rod 97 connected thereto and telescoped as shown in Fig. 1, into the end of a tube 98 attached by a short link 98ª to an arm 19ᵇ of each pair of bell-crank levers 19. A collar 99 is adjustably secured on each rod 97 and has attached thereto a coil spring 100 adapted to absorb the shock of the end of the tube 98 engaging the collar 99. For limiting the vertical movements of rod 88 (see Fig. 8) a notch 101 is formed therein into which extends a projection 102 formed on the bracket 83.

In operation, assuming the slidable brackets 20 to be moved away from the drums 16, tires suitably mounted on wheels such as 22 are mounted on rods 21 and the latter inserted in the hook-shaped brackets on arms 19ª of bell-crank levers 19.

Gears 52 are then clutched to shafts 50 and the brackets 20 advanced toward the drums 16 by operating cranks 57 so that the tires will just clear the faces of the drums without touching them. Each tire may be individually adjusted to proper position by throwing out all other of the clutches on gears 52, except the one desired.

Weights are then mounted on the hangers 42 until the desired load is applied to the tires which are forced against the drums thereby. It has been found convenient to mount levers 27 so as to multiply these weights ten times.

The drums 16 are then driven at a determinate speed, indicated by the speedometer 61, thereby causing the tires in effect to travel over their surfaces, the counters 64 indicating the mileage of the tires thereon.

Should a tire wear or blow-out or its pressure become too low, that is should an arm 19ª of a lever 19 advance toward a drum 16 more than a predetermined distance depending upon the setting of a rod 39, upward movement of a post 24 will cause a trip lever 34 to engage and pivot about the end of the rod 39 whereby a latch 30 will be drawn outwardly from slot 24ª (see Fig. 5) thus disengaging a lever 27 from the post 24, the lever 27 falling upon the bumper 68 and permitting the lever 19 to swing downwardly and to carry the tire away from the drum, such downward movement being limited by cross-head 26 engaging beams 13.

As the tire is swung away from the drum the tube 98 attached to the arm 19ᵇ of the lever 19 is forced downwardly into engagement with spring 100 and collar 99 (Fig. 1) thus forcing rod 88 (Fig. 8) downwardly permitting rod 82 to enter the slot 89 in rod 88. The bracket 68 moves away from the drum to carrying the wheel 65 therewith, whereby the exact mileage of the tire at the time of the blow-out etc., is registered on the counter 79.

After the tire which has blown-out or worn out etc., is removed another tire is mounted in contact with the drum, as described above, the head 29 being latched to the post 24 by swinging the long arm of lever 27 upwardly. To permit the re-engagement of the counter wheel 65 with the drum 16, the pedal 96 is depressed to remove the end of rod 82 from slot 89 thus permitting the spring 90 to force rod 88 upwardly to the position shown in Fig. 8.

It will be understood from the above brief description of operation that the device is adapted automatically to remove a tire from engagement with the drum and at the same time to accurately record the mileage of the tire upon the occurrence of a blow-out or the like. If a tire is manually removed from engagement with the drum the mileage indicator may be manually operated by giving collar 99 a sharp blow.

Modifications of my invention may be resorted to without departing from the spirit or scope thereof as claimed in the appended claims.

What I claim is:

1. A tire-testing machine comprising a rotary drum, a mounting for a tire normally holding the tire away from the drum, means for urging the tire relatively against the surface of the drum, and means adapted to be actuated by movement of the tire to release the first means when the tire bodily moves a predetermined distance relatively toward the drum.

2. A tire-testing machine comprising a rotary drum, a mounting for a tire normally holding the tire away from the drum, means for urging the tire against the surface of the drum and means adapted to be actuated by movement of the tire to release the first means when the tire is depressed to a determinate depth by said drum.

3. A tire-testing machine comprising a rotary drum, a mounting for a tire normally holding the tire away from the drum, means for urging the tire relatively against the surface of the drum, and means adapted to be actuated by movement of the tire to release the first means when the axis of the tire has moved a predetermined distance relatively toward said drum.

4. A tire-testing machine comprising a rotary drum, a mounting for a tire normally holding the tire away from the drum, means for urging the tire against the surface of said drum and means adapted to be actuated by movement of the tire for withdrawing the tire from the surface of the drum as the axis of the tire moves a predetermined distance toward the drum.

5. A tire-testing machine comprising a drum, a mounting for a tire normally holding the tire away from the drum, means for causing the tire to travel on the surface of said drum, and means adapted to be actuated by movement of the tire for removing the tire from said drum as the axis of the tire moves a predetermined distance toward the drum.

6. A machine comprising a rotary drum, a mounting for a tire normally holding the tire away from the drum, means for holding the tire against said drum said means being adapted to be actuated by movement of the tire to be released as the axis of the tire moves a predetermined distance toward the drum.

7. A tire-testing machine comprising means providing a surface, a mounting for a tire normally holding the tire away from the surface, means for urging the tire against said surface, means for relatively moving said tire over said surface and means adapted to be actuated by movement of the tire toward the surface for interrupting the means urging the tire against said surface as the axis of the tire advances a predetermined distance relatively toward said surface.

8. A tire-testing machine comprising a rotary drum, a mounting for a tire normally holding the tire away from the drum, and means for urging the tire against said drum said means being adapted to be actuated by movement of the tire to interrupt the means urging the tire against said drum as the axis of the tire moves a predetermined distance toward said drum.

9. A tire-testing machine comprising means providing a relatively traveling surface, a mounting for a tire normally holding the tire away from the surface, means for urging the tire against the surface said means being adapted to be actuated by movement of the tire to interrupt the means urging the tire against the surface when the tire blows-out.

10. A tire-testing machine comprising means providing a relatively traveling surface, a mounting for a tire normally holding the tire away from the surface, means for urging the tire against the surface said means being adapted to be actuated by movement of the tire automatically to interrupt the means urging the tire against the surface when the tire wears a predetermined amount.

11. A tire-testing machine comprising means providing a relatively traveling surface, a mounting for a tire normally holding the tire away from the surface, means for urging the tire against said surface, said means being adapted to be actuated by movement of the tire to interrupt the means urging the tire against said surface as the tire is depressed a predetermined distance by said surface.

12. A tire-testing machine comprising means providing a traveling surface and means for applying a tire to the surface, said means comprising a lever adapted to carry a tire toward or from the surface, and means adapted to releasably engage the lever for urging the tire toward the surface.

13. A tire-testing machine comprising means providing a traveling surface and means for applying a tire to the surface, said means comprising a lever adapted to carry a tire toward or from the surface, and means engaging the lever for urging the tire toward the surface said means being adapted to release said lever as the axis of the tire moves a predetermined distance relatively toward the surface.

14. A tire-testing machine comprising means providing a traveling surface and means for applying a tire to said surface, said means comprising a lever adapted to carry a tire toward or from the surface a second lever for operating said first lever and a link connecting said second lever with the first lever.

15. A tire-testing machine comprising means providing a traveling surface and means for applying a tire to said surface, said means comprising a lever adapted to carry a tire toward or from the surface a second lever for operating said first lever and a link releasably connecting said second lever with the first lever.

16. A tire-testing machine comprising means providing a traveling surface and means for applying a tire to said surface, said means comprising a lever adapted to carry a tire toward or from the surface, a link connected to the lever and a second lever so connected to said link as automatically to release the first lever as the axis of the tire moves a predetermined distance relatively toward the traveling surface.

17. A tire-testing machine comprising means providing a traveling surface and means for applying a tire to said surface, said means comprising a lever adapted to carry a tire toward or from the surface, a second lever adapted to be operatively connected with said first lever, and means adapted to disconnect said levers as the axis of the tire moves a predetermined distance relatively toward said surface.

18. A tire-testing machine comprising means providing a traveling surface and means for applying a tire to said surface, said means comprising a lever adapted to carry a tire toward or from the surface, a second lever adapted to be operatively connected with said first lever, and means adapted to disconnect said levers as the axis of the tire moves a predetermined distance relatively toward said surface, said means comprising a latch-head on said second lever and a link connected to said first lever and releasably connected to said latch-head.

19. In a tire-testing machine, means providing a traveling surface and means for urging a tire against said surface, said means including a member having a slot therein, means operatively connected to said member including a latch head embracing said member, a latch normally urged toward said member to maintain the same in said slot, a trip lever engageable with said latch and means for tripping said lever when the axis of the tire moves a predetermined distance toward said surface.

20. A tire-testing machine comprising means providing a traveling surface, a member adapted to carry a tire toward and from said surface, said member being normally urged away from said surface and means releasably connected to said member for urging the tire toward said surface.

21. A tire-testing machine comprising means providing a traveling surface, a member adapted to carry a tire toward and from said surface, said member being so supported and so positioned with respect to said surface that the tire-supporting member tends to move by gravity away from said surface and means releasably connected to said member for urging the tire toward said surface.

22. A tire-testing machine comprising means providing a traveling surface and a lever system for urging a tire toward and from said surface said system being adapted to be disconnected as the axis of a tire moves a predetermined distance relatively toward the surface.

23. A tire-testing machine comprising means providing a surface and means for causing a plurality of tires to travel on said surface, said means being adapted to withdraw a tire from said surface as its axis moves a predetermined distance toward said surface and without affecting any other tire in contact with said surface.

24. A tire-testing machine comprising means providing a traveling surface and means for applying a tire to said surface, said means comprising a bell-crank lever adapted to support a tire on one arm thereof, said lever being so positioned with respect to said surface that the tire-supporting arm tends to swing away from said surface, and means connected to the other arm for urging said tire-carrying arm toward said surface.

25. A tire-testing machine comprising means providing a traveling surface and means for applying a tire to said surface, said means comprising a bell-crank lever adapted to support a tire on one arm thereon, said lever being so positioned with respect to said surface that the tire-supporting arms tend to swing away from said surface, and means for limiting the motion of said arm away from said surface.

26. A tire-testing machine comprising means providing a traveling surface, a bell-crank lever having one arm adapted to carry a tire toward or from said surface said arm being normally urged away from said surface, a link connected to the other arm of said bell-crank lever, a lever operatively connected to said link and a weight hanger on said lever.

27. A tire-testing machine comprising means providing a traveling surface, a bell-crank lever having one arm adapted to carry a tire toward or from said surface said arm being normally urged away from said surface, a link connected to the other arm of said bell-crank lever, a lever connected by a latch to said link, a weight hanger on said lever and means for releasing said latch as the axis of the tire is urged a predetermined distance relatively toward said surface.

28. A tire-testing machine comprising means providing a traveling surface, a bell-crank lever having one arm adapted to carry a tire toward or from said surface said arm being normally urged away from said surface, a link connected to the other arm of said bell-crank lever, a lever connected by a latch to said link, a weight hanger on said lever, means for releasing said latch as the axis of the tire is urged a predetermined distance relatively toward said surface, and means for bodily moving the levers toward or from said surface.

29. A tire-testing machine comprising a surface, means for causing a tire to travel on said surface and adapted to be actuated by movement of the tire to withdraw the tire from said surface as its axis moves a predetermined distance toward said surface and means for indicating the mileage of said tire on said surface.

30. A tire-testing machine comprising a surface, means for causing a tire to travel on said surface and adapted to be actuated by movement of the tire to withdraw the tire from said surface as its axis moves a predetermined distance toward said surface, and means for indicating the mileage of said tire on said surface said means being adapted to discontinue counting mileage as the tire is withdrawn from the surface.

31. A tire-testing machine comprising a surface, means for causing a tire to travel on said surface and means for indicating the mileage of the tire on said surface said means being adapted to be actuated by movement of the tire to discontinue counting mileage as the tire is withdrawn from said surface.

32. In a tire-testing machine the combination with means providing a traveling surface of means for urging a tire against said surface, said means being adapted to be actuated by movement of the tire to withdraw the tire from said surface as the axis of the tire moves a predetermined distance toward said surface, and a mileage counter in contact with said surface said counter being adapted to be withdrawn from said surface as said tire is withdrawn therefrom.

33. In a tire-testing machine the combination with means providing a traveling surface of means for advancing a tire toward or from said surface and a mileage counter in contact with said surface adapted to be actuated by movement of the tire to be withdrawn from such contact as the tire is moved away from said surface.

34. In a tire-testing machine the combination with means providing a traveling surface of means adapted to carry a tire toward or from said surface and a mileage counter in contact with said surface and so connected to said means as to be withdrawn from such contact as the tire is moved away from said surface.

35. In a tire-testing machine, the combination with means providing a traveling surface of means adapted to carry a tire toward or from said surface, said means being normally urged away from said surface, releasable means operable on said first means for urging the same toward said surface, a mileage counter in contact with said surface and means connecting said counter with the first means adapted to effect the withdrawal of said counter from said surface when the second means is released.

36. In a tire-testing machine, the combination with means providing a traveling surface of a bell-crank lever adapted rotatably to support a tire on an arm thereof, said arm being normally urged away from said surface, means connected by a latch to the other arm of said lever to urge the tire-carrying arm toward said surface, means for releasing the latch when the axis of the tire is moved a predetermined distance toward said surface, a mileage counter in contact with said surface and a link connecting said counter to said other arm for effecting the withdrawal of said counter from said surface when the latch is released.

37. In a tire-testing machine the combination with means providing a traveling surface of a bell-crank lever adapted rotatably to support a tire on an arm thereof said arm being normally urged away from said surface, means connected by a latch to the other arm of said lever to urge the tire-carrying arm toward said surface, means for releasing the latch when the axis of the tire is moved a predetermined distance toward said surface, a mileage counter in contact with said surface and a telescoping link connecting said counter to said other arm the shortening of said link being determinately limited for effecting the withdrawal of said counter from said surface when the latch is released.

38. In combination with a tire testing drum and mounting means for holding a tire against the drum, said means being movable away from the drum by shifting of the mounting means a predetermined distance toward the drum, a mileage counter comprising a movable bracket, a wheel journaled on said bracket, means for urging said bracket against the drum, and means actuatable by movement of the mounting means away from the drum adapted to release said urging means to permit said bracket to move away from the drum.

39. In combination with a tire testing machine including means providing a relatively traveling surface and mounting means for holding a tire against the surface, said means being movable away from the surface by shifting of the mounting means a predetermined distance toward the surface, a mileage counter comprising a pivotally mounted bracket, a wheel journaled on said bracket, said bracket being normally urged in one direction, means adapted to urge said bracket in an opposite direction, and means actuatable by movement of the mounting means away from the surface adapted to release the first means.

40. In combination with a tire testing machine including means providing a relatively traveling surface and mounting means for holding a tire against the surface, said means being movable away from the surface by shifting of the mounting means a predetermined distance toward the surface, a mileage counter comprising a pivotally mounted bracket, a wheel journaled on said bracket, said bracket being adapted to swing by gravity in one direction, means for urging said bracket in the opposite direction, and means actuatable by movement of the mounting means away from the surface adapted to release said urging means.

WILLIAM C. STEVENS.